United States Patent [19]

Crow

[11] 4,237,603
[45] Dec. 9, 1980

[54] METHOD FOR ASSEMBLING A TERMINAL TO A BATTERY SIDE WALL

[75] Inventor: Jerry V. Crow, Muncie, Ind.

[73] Assignee: General Motors Corporation, Detroit, Mich.

[21] Appl. No.: 959,420

[22] Filed: Nov. 13, 1978

Related U.S. Application Data

[62] Division of Ser. No. 851,211, Nov. 14, 1977, Pat. No. 4,154,907.

[51] Int. Cl.³ .............................................. H01M 2/06
[52] U.S. Cl. .................................... 29/623.4; 156/293
[58] Field of Search ................. 29/623.4, 623.2, 623.1; 429/179, 160, 161; 156/293

[56] References Cited

U.S. PATENT DOCUMENTS

| | | | |
|---|---|---|---|
| 2,000,199 | 5/1935 | Stanley | 29/623.2 |
| 2,548,558 | 4/1951 | Raney | 429/179 |
| 3,764,393 | 10/1973 | Fujimoto | 429/160 |
| 3,767,467 | 10/1973 | Miller et al. | 429/179 |
| 3,767,889 | 10/1973 | Sano et al. | 29/623.1 |
| 3,928,079 | 12/1975 | Jennings et al. | 429/179 |

FOREIGN PATENT DOCUMENTS

| | | | |
|---|---|---|---|
| 1379906 | 1/1975 | United Kingdom | 429/179 |
| 1431770 | 4/1976 | United Kingdom | 429/179 |

*Primary Examiner*—Daniel C. Crane
*Attorney, Agent, or Firm*—Lawrence Plant

[57] ABSTRACT

A leakproof, side terminal battery of the thin-wall type comprising a terminal insert formed by injection molding a thermoplastic body about a conductive spool, which insert is mated with an aperture in the battery case wall and welded to a boss surrounding the aperture. The body includes a plug portion for insertion into the aperture and a flange portion for welding to the boss. The conductive spool preferably includes an extension projecting into the battery for fusing to the battery's innards at a location remote from the wall.

1 Claim, 6 Drawing Figures

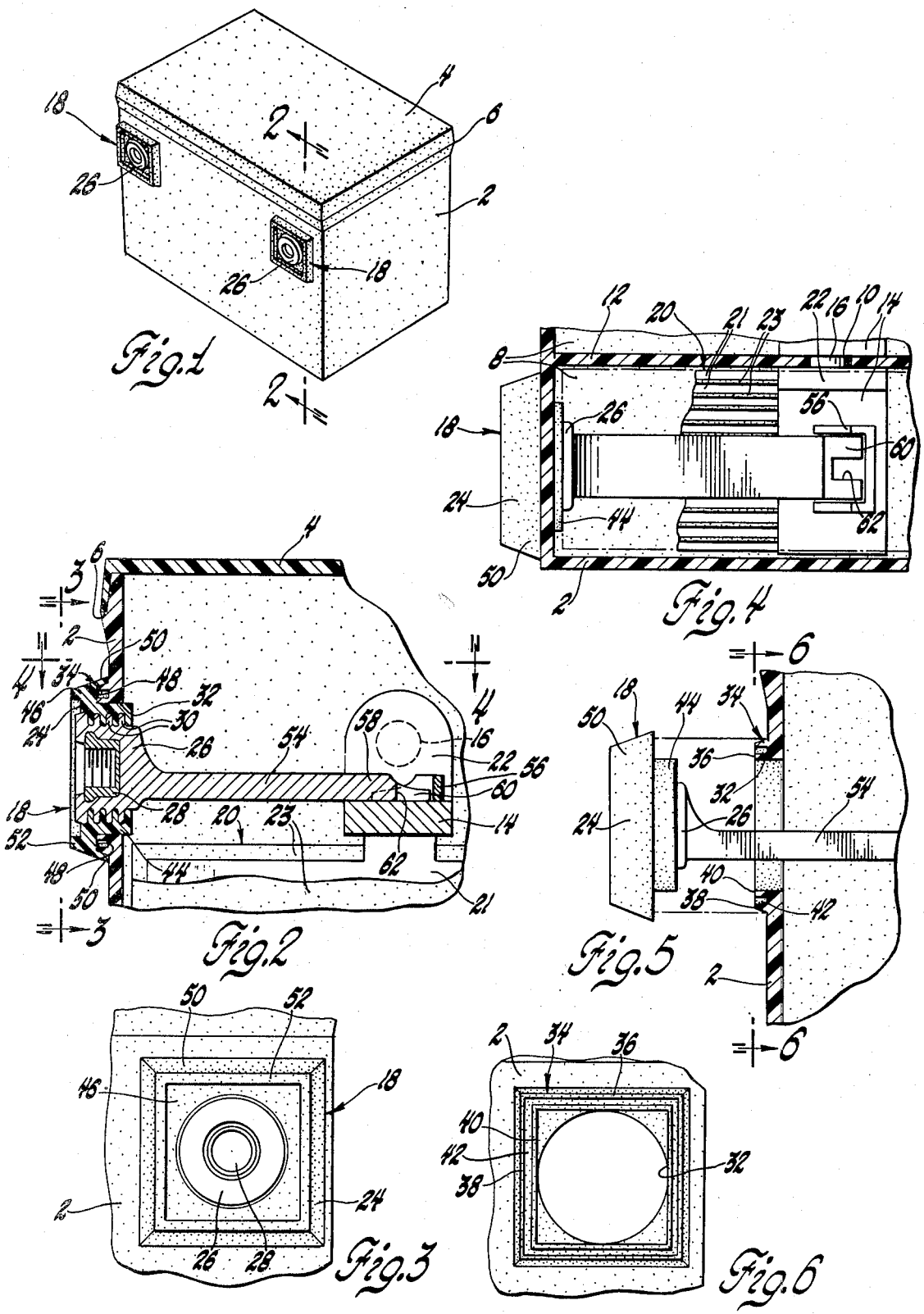

METHOD FOR ASSEMBLING A TERMINAL TO A BATTERY SIDE WALL

This is a division, of application Ser. No. 851,211, filed Nov. 14, 1977 now U.S. Pat. No. 4150907 issued 5/15/79.

BACKGROUND OF THE INVENTION

This invention relates to electric storage batteries of the type having their external terminals in the side or end walls of the battery container and primarily automotive batteries which are subjected to wide temperature excursions and active jostling, bouncing and the like in use. One such battery having a recessed, threaded female terminal is disclosed in Rowls et al U.S. Pat. No. 3,775,730. Batteries of this type have their terminals beneath the electrolyte level of the battery and hence the joint must necessarily be liquid-tight to preclude the seepage of any corrosive electrolyte through the terminal. Experience has shown that reliable, liquid-tight joints are difficult to consistently produce (i.e., on a production basis) in batteries having thin-wall (i.e. about 0.100 inch or less), plastic cases. In one proposed method of assembly of side terminals (i.e., Miller U.S. Pat. No. 3,767,467), a terminal is provided with a projection which is inserted through an aperture in the case wall and mates with, and is fused to, a retaining ring on the inside of the wall. In such a process, fusing is achieved by turning the case on its side (i.e., terminals down) and gas burning the terminal and ring together. Thereafter, the case is righted, the battery innards inserted and the plate straps thereof welded to the ring (again by turning on its side) to complete the internal connection. Such connections made on a production basis have a tendency to leak not only because the mechanical joint itself is not always tight enough to prevent leakage, but also because the heat generated during the fusings causes distortion of the plastic around the terminal and further degrades the seal. Accordingly, manufacturers of this type connection have customarily provided an additional sealant such as hot melt at the terminal-case joint to insure adequate sealing. Another approach to the manufacture of side terminal batteries has been to die cast the terminal into an aperture performed in the battery case wall. Such techniques not only require rather critical manufacturing variables and tooling but also tend to have slower production rates. Moreover, each of the aforesaid processes have a portion formed on the inside of the case wall which hinders subsequent insertion of the battery innards into the case.

It is therefore an object of the present invention to provide a fluid type side terminal battery design and assembly process which yield a highly reliable seal. It is a further object of this invention to provide a side terminal structure and assembly process which does not interfere with the insertion of the battery's innards and makes more effective utilization of the internal volume of the battery. It is a still further object of this invention to provide a side terminal battery structure and assembly process in which the connections to the battery's innards (i.e., plates and plate straps) may be made at locations remote from the wall of the case through which the terminal passes. These and other objects and advantages of the present invention will become more readily apparent from the detailed description which follows.

BRIEF DESCRIPTION OF THE INVENTION

This invention comprehends a side terminal battery in which the terminal is formed in two distinct, highly effective sealing operations. A terminal insert is formed wherein a spool-like conductive member (hereafter conductive spool) is positioned in an injection molding die and has a specifically shaped thermoplastic body (e.g., polypropylene, polyethylene, etc.) injection molded around it. Injection molding the hot thermoplastic about the conductive spool provides a more fluid-tight joint therewith than can be achieved by merely mechanically joining them. The molded body of the terminal insert has a plug portion which is inserted into an aperture in the container wall and a flange portion on one end of the plug portion which is adapted to be continuously welded to the rim of a sealing boss circumscribing the aperture. One end of the conductive spool is coupled to the battery's innards while the other end is on the outside of the container and is adapted to receive a battery cable connector.

In a preferred embodiment, the rim of the boss is divided into two concentric portions spaced apart by a groove atop the rim, which portions are heat welded to the insert's flange. A double welded seal circumscribing the aperture is thus provided. In a most preferred embodiment, the flange on the insert includes a skirt circumscribing the boss to hide the weldment, and the spool includes an extension for welding to the innards at a location remote from the container wall. This remote welding prevents any loss of seal that might otherwise have occurred due to the application of heat nearer the plastic-spool joint.

A particular advantage of the present invention is that the battery innards (i.e., plates, separators and plate straps) may be inserted into the container before the terminals are assembled and before any part of the terminal projects into the container to hinder insertion. Hence, no non-usable space need be provided in the end cell of the container to permit insertion of the innards around the terminal as has heretofore been required when the terminals were assembled first and had their locking ring obstructing innard insertion.

DETAILED DESCRIPTION OF AN EMBODIMENT OF THE INVENTION

FIG. 1 is a perspective view of a side terminal type battery.

FIG. 2 is a sectioned side elevational view through a terminal of FIG. 1 taken in the direction 2—2.

FIG. 3 is a front elevational view in the direction 3—3 of FIG. 2.

FIG. 4 is a sectioned plan view in the direction 4—4 of FIG. 2.

FIG. 5 is a partially sectioned, exploded side elevational view of the terminal insert of the present invention just prior to insertion into the aperture in the battery case wall.

FIG. 6 is a front elevational view in the direction 6—6 of FIG. 5 showing the aperture and circumscribing sealing boss formed on the case wall.

The Figures illustrate an automotive-type, Pb-acid, side terminal battery. Such batteries typically have six 2 volt cells in series for a 12 volt battery. The battery comprises a thin-wall (i.e., less than 0.100 inch) plastic (e.g., polypropylene) container 2 having a cover 4 heat sealed thereto at the junction 6. Electrochemical innards 20 in each cell 8 of the battery are electrically joined one to the other inside the battery through an aperture 10 in the intercell partition 12. The battery's innards 20 include a plurality of positive and negative plates (i.e., 21) separated by an ion permeable separator 23. Plate straps 14 connect the several plates of like polarity together and include a plate strap lug 22 joined to an intercell connection 16 extending through the aperture 10 as is well known in the art. The battery's external terminals 18 enter the end cells of the battery for electrically communicating the innards 20 to the external electrical loads they serve.

The terminal 18 is essentially a preformed insert comprising a thermoplastic body 24 (i.e., polypropylene) injection molded around a lead spool 26 which has a stainless steel nut 28 embedded therein. The spool 26 includes a plurality of locking fins 30 which prevent axial withdrawal of the spool 26 from the thermoplastic body 24 while at the same time providing a tortuous path for any electrolyte to traverse along the Pb-plastic interface and before it could immerge on the outside of the terminal as a leak. A plurality of anti-twist webs (not shown) are provided between the several fins 30 to prevent rotation of the spool 26 within the body 24 during the connecting or disconnecting of the cable connectors. Injection molding of the body 24 (i.e., in an appropriately shaped die cavity) about the spool 26 causes the pressurized, hot thermoplastic material to seek and fill any voids that might be formed in the spool 26, and upon cooling forms a liquid-impassible joint with the spool not found possible by a mere mechanical joint.

The wall of the container 2 is provided with an aperture 32 adapted to receive the terminal insert 13. An annular sealing boss 34 is provided on the outside of the container 2 and circumscribes the aperture 32. The boss 34 has a rim 36 thereon which is adapted to be softened (i.e., preferably by heat but alternatively by solvent depending on the plastic used) for welding to the terminal insert 18. In the preferred embodiment shown, the rim 36 is divided into two concentric portions 38 and 40 by a groove 42. This provides two concentric sealing surfaces as a double seal—though it is recognized that for many applications an un-divided or single rim would also be acceptable.

The molded body 24 of the insert 18 includes a plug portion 44 so sized and shaped as to mate tightly with the aperture 32. A flange 46 is provided on the end of the plug 44 which is to remain on the outside of the container 2 after assembly. The flange 46 overlies the boss 34 and has an underside 48 adapted to be softened at the same time and in the same manner as the rim 36 of the boss 34. During assembly the softened flange and rim are pushed together and upon resolidification become welded together. Preferably softening is accomplished by simultaneously heating the rim 36 and the underside 48 of the flange 46 with an appropriately shaped platen therebetween, withdrawing the platen and pushing the two parts together while both are still soft.

Preferably, the flange 46 includes a skirt 50 depending from the underside 48 thereof so as to completely enclose and hide the boss 34 after welding of the body 24 to the boss 34. The skirt 50 hides the weldment formed between the rim 36 and flange 46 and thereby generally improves aesthetics of the battery as well as serving to contain the soft plastic during assembly. The body 24 may also include an annular ridge 52 extending above the outside face of the spool 26 to protect the battery against short circuiting as discussed in Rowls et al U.S. Pat. No. 3,775,730 (supra).

The spool 26 is provided with an extension 54 which extends well into the cell 8 away from the spool-bearing wall of the container 2 and has its end 58 welded (e.g., gas burned, TIG, etc.) to the plate strap 14 at a location where none of the welding heat can affect the side terminal seal. A three-sided nest 56 is provided on the upper surface of the plate strap 14 and is adapted to receive the end 58 of the extension 54 during assembly. The end 58 has a reduced cross-section 60 for easy melting and a slot 62 which exposes the upper surface of the plate strap 14 to the tip of the welding torch. The welding flame is then directed into the slot 62 causing simultaneous fusion of both the upper surface of the strap 14, and the reduced cross-section 60 while the nest 56 further acts as a dam to contain the melt produced.

While the invention has been described primarily in terms of a specific preferred embodiment thereof, it is not to be limited thereto but rather only to the extent set forth hereafter in the claims which follow.

The embodiments of the invention in which an exclusive property or privilege is claimed are defined as follows:

1. A process for assembling a terminal in the side wall of a thermoplastic electric storage battery container comprising the steps of:

forming said container such that at least one of its walls has an aperture therein and a boss on the outside of said wall circumscribing said aperture, said boss being adapted for softening and welding to a terminal insert;

molding a thermoplastic body around a conductive spool to form a terminal insert said body having a plug portion adapted to extend in close fitting relation to and through said aperture and a flange portion adapted to overlie and be welded to said boss; softening said boss and said flange; and thereafter inserting said plug portion into said aperture in tight fitting relation thereto and pressing said softened flange and boss into engagement one with the other to sealingly weld them together around said aperture upon hardening.

* * * * *